Patented Feb. 12, 1946

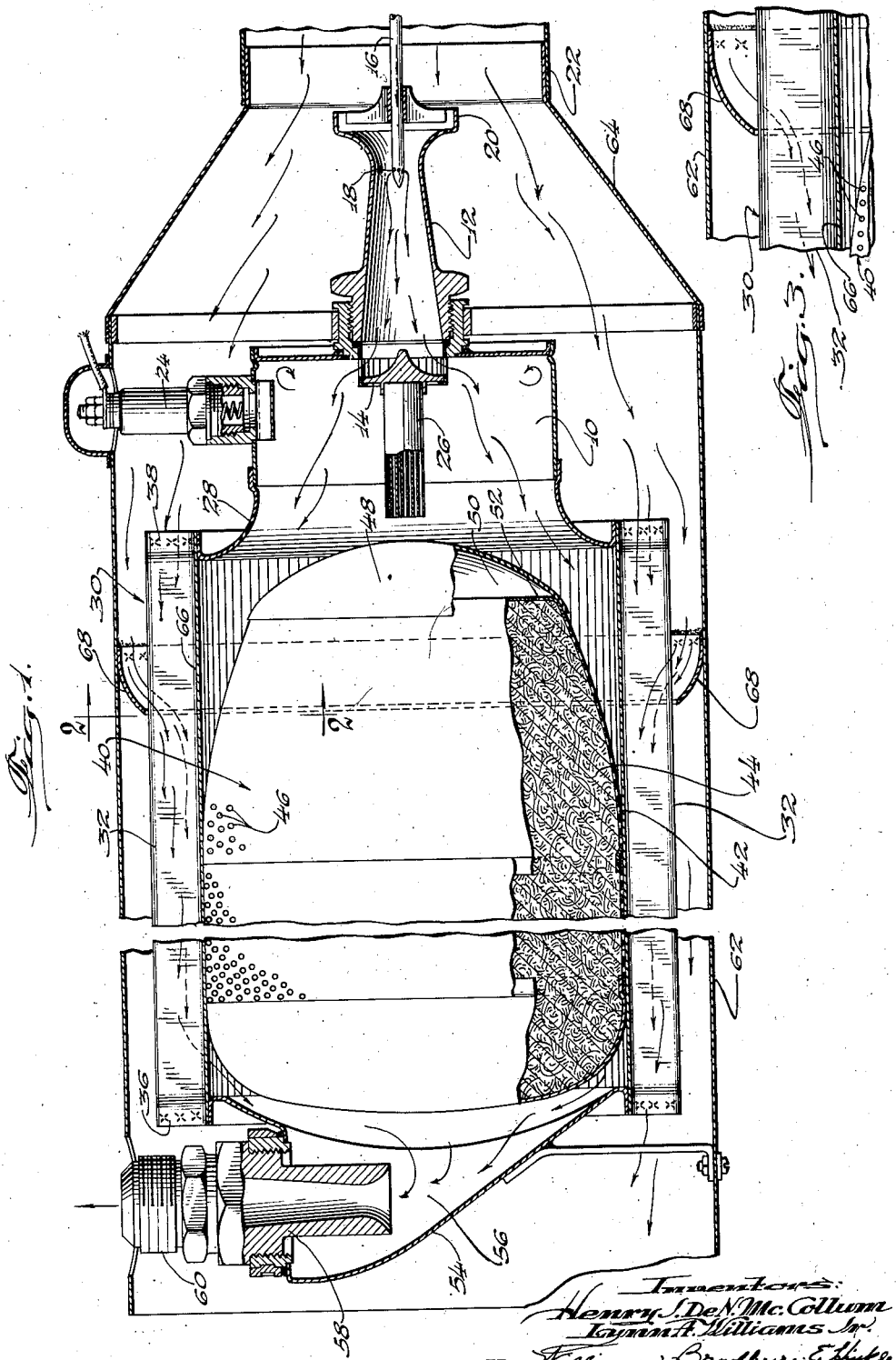

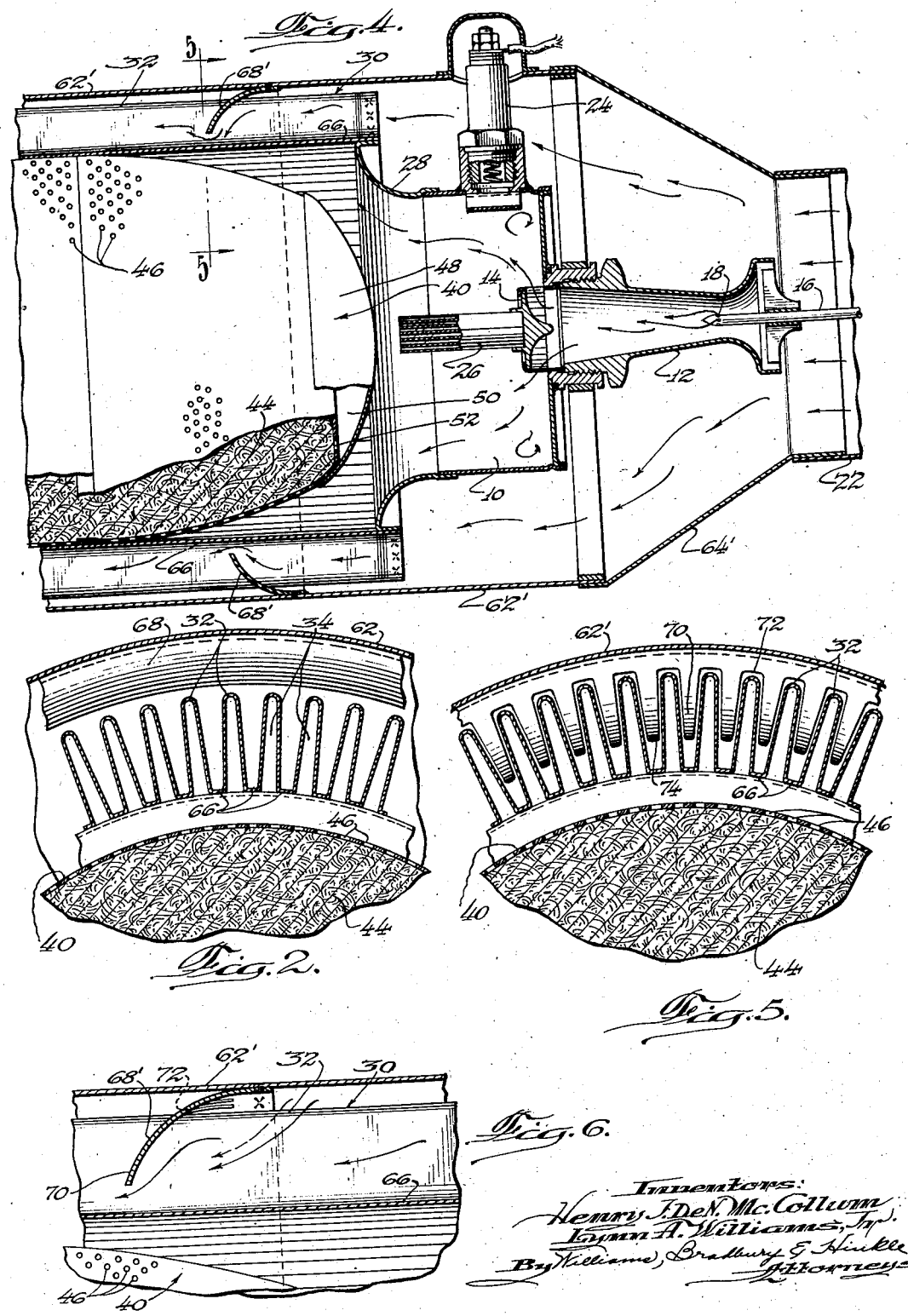

2,394,627

UNITED STATES PATENT OFFICE 2,394,627

HEATING APPARATUS

Henry J. De N. McCollum, Chicago, and Lynn A. Williams, Jr., Northfield, Ill.; said Williams assignor to Stewart-Warner Corporation, Chicago, Ill., a corporation of Virginia; Thelma McCollum, executrix of said Henry J. De N. McCollum, deceased Application October 21, 1942, Serial No. 462,788

3 Claims. (Cl. 126—116)

Our invention relates to heating apparatus, and more particularly to heaters of the internal combustion type, especially adapted for, but not limited to, use in aircraft.

In heaters of the internal combustion type, it is common to provide finned heat transfer means for transferring heat from the products of combustion to ventilating air directed over the heat transfer means by a ram or blower, or other air circulating means. The heated products of combustion are originally directed against the fins at one end of the heat transfer means and where the hot products of combustion first come in contact with the fins, these fins are raised to a temperature which is much in excess of the temperature of other portions of the fins and particularly that portion adjacent the outlet end of the heater. There is a practical limit to the temperature to which any part of the fins can be heated and in the prior art heaters it was necessary to operate large portions of the fins at temperatures materially below this limit in order that the hot spots in the fins should not exceed this limit.

An object of our invention is to provide heating apparatus of the internal combustion type in which local hot spots are eliminated and the heat transfer means is heated to a substantially uniform temperature throughout its length.

Another object of our invention is to provide heating apparatus wherein the temperature range between different parts of the heat transfer means is reduced to a minimum and stresses and strains caused by great variations in temperature of different portions of the heat transfer means are avoided.

Another object of our invention is to provide heating apparatus wherein the entire area of the heat transfer means can be maintained at substantially the temperature limit dictated by the material of which this transfer means is made and the heating apparatus can furnish the maximum heat output for a given size and kind of material.

Another object of our invention is to provide new and improved heating apparatus which is extremely light in weight and compact and has a high heat output.

Other objects and advantages will become apparent as the description proceeds.

In the drawings:

Fig. 1 is a view showing a longitudinal section through a preferred embodiment of our invention;

Fig. 2 is a view showing a partial, transverse section taken on the line 2—2 of Fig. 1;

Fig. 3 is a fragmentary view in longitudinal section and illustrating a feature of our invention on an enlarged scale;

Fig. 4 is a view showing a partial longitudinal section through a modified form of our invention;

Fig. 5 is a view showing a partial, transverse section taken on the line 5—5 of Fig. 4; and Fig. 6 is a fragmentary view in longitudinal section showing a feature of our invention on an enlarged scale.

The embodiment disclosed in Figs. 1, 2 and 3 comprises a combustion chamber 10 supplied with a combustible mixture by a carburetor 12 having an outlet end communicating with the combustion chamber by way of a burner tube 14 which serves to give the combustible mixture a whirling motion as it enters the combustion chamber. A fuel supply pipe 16 furnishes either fuel or a rich mixture of fuel and air to the carburetor 12 and has outlet openings 18 located in the restricted throat of this carburetor. The right-hand end 20 of the carburetor is supplied with air from the heater inlet 22 which is adapted to be connected with a ram, blower, or other air circulating means.

One or more electrical igniters 24 ignite the combustible mixture when it first enters the combustion chamber 10. These igniters are usually connnected to a source of current supply by way of a thermostatic switch which is responsive to the temperature of the heater and which disconnects the igniters from their current source when the heater attains normal operating temperature. The re-igniter 26 is provided to insure maintenance of combustion after the igniters 24 have been cut off from their current source.

The flaring, annular plate 28 serves to connect the combustion chamber 10 with one end of a tubular heat transfer means or heat exchanger 30. This heat exchanger is preferably formed of sheet metal and has hollow fins 32 (Fig. 2) extending lengthwise thereof and providing passages 34 for the hot products of combustion delivered to this heat exchanger by the combustion chamber 10. The ends of the hollow fins 32 are pinched together, as indicated at 36 and 38 in Fig. 1, or are otherwise suitably sealed to close the ends of the gas passages 34.

A muffler 40 is located in the tubular heat exchanger 30 and has a sheet metal shell 42 containing a quantity of sound absorbing material 44, such as glass wool or stainless steel wool. The shell 42 is provided with openings 46 forming acoustic couplings between the interior of the shell and the gas passages, whereby sound entrained in the products of combustion may pass into the interior of the muffler shell and be absorbed by the glass wool therein. A sheet metal cap 48 is welded or otherwise secured to one end of the muffler shell 42 and cooperates therewith to form a heat insulating and resonance chamber 50 which is acoustically connected to the interior of the muffler shell by openings 52.

The lefthand end of the tubular heat exchanger 30 is closed by a plate 54 shaped to form an outlet chamber 56 into which the cooled products of combustion flow from the lefthand ends of the passages 34. These cooled gases or products of combustion are discharged to the atmosphere through an outlet fitting 58 and any suitable exhaust pipe attached to the threaded end 80 of this fitting.

A cylindrical sheet metal casing 62 surrounds the heat exchanger 30 and cooperates therewith to form a passage for ventilating air between and around the hollow fins 32. A sheet metal cone 64 connects the righthand end of this casing 62 with the heater inlet 22 which supplies the ventilating air flowing between this casing and the heat exchanger 30. This ventilating air absorbs heat from the heat exchanger and the heated ventilating air is discharged from the lefthand end of the casing 62 into the aircraft cabin or other space to be heated or into a system of ducts for conducting this ventilating air to selected locations.

The hot gases flowing from combustion chamber 10 first contact the righthand ends of the hollow fins and tend to heat these ends of the fins and particularly the bases 66 thereof to a temperature higher than the remaining portions of the fins. We have provided special means to prevent this portion of the fin bases from attaining a temperature higher than the remaining portions of the fins. In Fig. 1, this means assumes the form of an annular sheet metal baffle 68 which is welded or otherwise secured to the interior of the cylindrical casing 62 and which serves to direct the ventilating air more intensively against the righthand end of the fins and particularly against the base portions of this righthand end. This baffle is curved in cross section, as more clearly shown in Fig. 3, and the inner edge of the baffle closely approaches the tips of the fins.

The curvature of the baffle 68 changes the direction of the ventilating air flow with a minimum of resistance to this flow and directs the ventilating air against the bases of the fins at an angle more nearly approaching the perpendicular. At the same time, the rate of flow of the ventilating air is materially increased where it is forced against the fins and crowded between these fins and the inner edge of the baffle 68. The increased angle of attack of the air against the fin surface and the increased speed of this air produce an increased scouring action at and adjacent the baffle 68 and greatly increase the rate of heat transfer at this point from the fins and particularly the fin bases to the ventilating air. This increased rate of heat transfer from the fins to the ventilating air prevents the temperature of the adjacent portions of the fins from rising above the temperature of other portions of the fins closer to the outlet end of the heater. The entire surface of the heat exchanger 30 is thus maintained at a substantially constant temperature and, since this temperature may be the practical limit for the material used, our novel heater is capable of producing a heat output equal to the theoretical maximum for any given size and style of heater.

In the preferred arrangement, as shown, the muffler 40 extends completely across the open central portion of the tubular member 30 so as to cause all of the combustion gases to flow through the passages 34 inside of the fins 32 formed by the deep longitudinally extending corrugations of the wall, such combustion gases being deflected outwardly to such passages 34 by the backwardly tapered shell of the muffler. The baffle 68 carried by the casing outside of the tubular member 30 is located in such position with respect to the muffler 40 that the cold air on the outside of said member 30 is directed into contact with the outer face portions of the corrugations at approximately the same point longitudinally of the heater as that at which the hottest part of the combustion gas stream contacts the inner face portions of the corrugations. The result is that there is a highly effective transfer of heat from the limited quantity of the combustion gases to the comparatively much greater quantity of the cold air to be heated, serving to protect the metal wall portions from being burned out even though such wall portions be of comparatively very thin metal. This arrangement provides for a maximum heat transfer in proportion to the weight of the sheet metal jacket of said heat transfer member 30 which feature is, of course, of very great importance in connection with a heater for use for aircraft.

The modification shown in Figs. 4, 5 and 6 is identical with the heater previously described, except that the sheet metal casing fits more closely about the heat exchanger 30 and a different type of baffle is used to direct the ventilating air into more intimate contact with the fins. In the embodiment of Figs. 4, 5 and 6, the cylindrical casing 62' is of slightly smaller diameter than the cylindrical casing 62 and fits more closely about the tips of the fins of the heat exchanger 30. The inlet or righthand end of the casing 62 is connected to the heater inlet 22 by a sheet metal cone 64' which is identical with the cone 64, except that the enlarged end of the cone 64' is made of appropriate size to fit the smaller diameter of the casing 62'.

Ventilating air entering the inlet 22 is directed through cone 64' into the inlet end of casing 62' and starts flowing between the righthand end of the heat exchanger 30 and the cylindrical wall of the casing 62'. The annular baffle 68' deflects this ventilating air toward the heat exchanger 30 into more intimate contact with the fins thereof and particularly with the bases of these fins to increase the rate of heat transfer between the ventilating air and fins over that portion of the heat exchanger which is first contacted by the hot gases from the combustion chamber 10.

The baffle 68' is curved in cross section, as most clearly indicated in Fig. 6, and has a serrated inner edge providing fingers 70 which extend between the outer portions of the fins 32. These fingers 70 have lateral edges parallel to the side walls of the fins 32 and spaced slightly therefrom to permit thin films of air to flow between the edges of the fingers 70 and the side walls of the fins. The bottoms 72 of the recesses formed in baffle 68' between adjacent fingers 70 are also spaced from the tips of the fins 32 and permit some air to flow between these bottoms and the fin tips to absorb heat therefrom. The ends 74 of the fingers 70 are spaced from the bases 66 of the fins and most of the ventilating air rushes through the restricted passages formed between these finger ends and the fin bases.

The rush of ventilating air adjacent the fin bases scours these bases and the lower portions of the side walls of the fins and absorbs great quantities of heat therefrom. This prevents the creation of hot spots in that portion of the heat exchanger which is first contacted by the hot products of combustion. The elimination of hot spots in the heat exchanger is effected with a minimum of additional parts and a minimum increase in weight of the heater. Stresses and strains in the heat exchanger are thereby avoided, but the greatest advantage is the material increase in the total heat output which much more than offsets the slight increase in weight and the slightly greater resistance of the heater to the flow therethrough of the ventilating air.

Because the heating apparatus embodying our invention can be made extremely compact and light in weight for a given heat output, our heating apparatus is particularly adapted for use in aircraft and under other conditions where savings in weight and size are of particular importance. Our heating apparatus, however, is not limited to such use, but is equally adapted for other purposes. Furthermore our invention is not to be understood as limited to the details shown and described, but may assume numerous other forms and is to be construed as including all modifications and variations falling within the scope of the appended claims.

We claim:

1. In a heating apparatus of the class described, the combination of a heat transfer member having its wall deeply corrugated longitudinally, means for delivering heated gases forwardly into said member, backwardly tapered means in said member adapted to direct said heated gases outwardly into the inside passages between the corrugations, and means surrounding said member adapted to direct air to be heated inwardly into the outside passages between the corrugations at substantially the same position longitudinally of the heater as that at which the heated gases are directed into the inside passages for effecting a maximum transfer of heat from the wall to said air.

2. In a heating apparatus of the class described, the combination of a heat transfer member having its wall deeply corrugated longitudinally, means for delivering heated gases forwardly into said member, backwardly tapered means in said member adapted to direct said heated gases outwardly into the inside passages between the corrugations, a casing surrounding said member in outwardly spaced relation thereto, means for delivering air to be heated forwardly through said casing about said member, and a baffle mounted on the inner face of said casing in close proximity to the outer edges of said corrugations and positioned at such distance along the heater as to direct the air into the outside passages between the corrugations at substantially the same position longitudinally of the heater as that at which the heated gases are directed into the inside passages between the corrugations.

3. In a heating apparatus of the class described, the combination of a heat transfer member having its wall deeply corrugated longitudinally, means for delivering heated gases forwardly into said member, backwardly tapered means in said member adapted to direct said heated gases outwardly into the inside passages between the corrugations, a casing surrounding said member in outwardly spaced relation thereto, means for delivering air to be heated forwardly through said casing about said member, and a baffle mounted on the inner face of said casing in close proximity to the outer edges of said corrugations and having fingers extending into the outside passages between the corrugations in closely spaced relationship to the wall portions of the passages, such baffle being positioned at such distance along the heater as to direct the air into said outside passages at substantially the same position as that at which the heated gases are directed into the inside passages between the corrugations.

HENRY J. DE N. McCOLLUM.
LYNN A. WILLIAMS, JR.